March 28, 1961  O. WEIBEL  2,976,843
POSITION CONTROL APPARATUS
Filed April 13, 1959
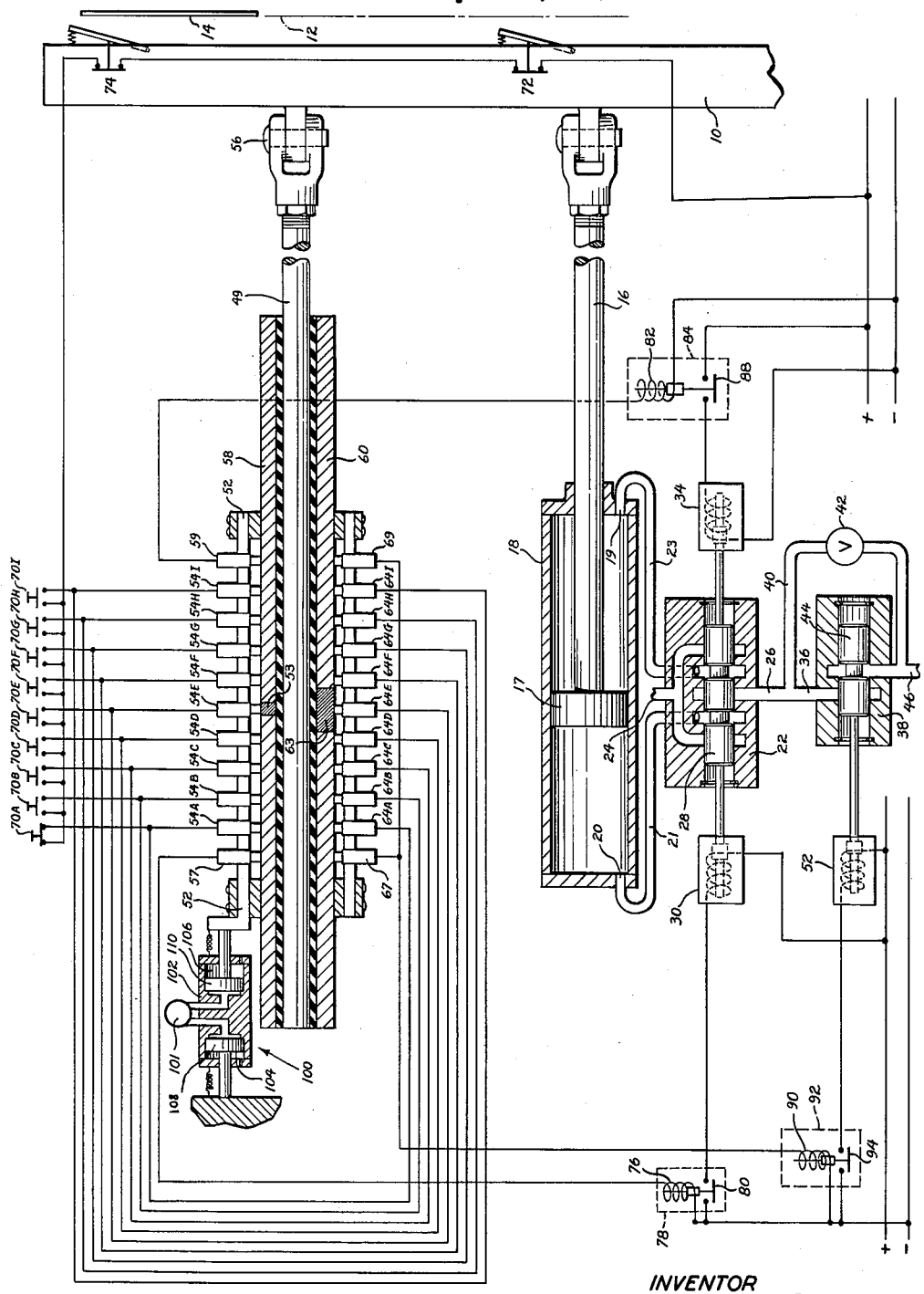
INVENTOR
O WEIBEL
BY- Fetherstonhaugh & Co.
ATTORNEYS United States Patent Office 2,976,843
Patented Mar. 28, 1961

2,976,843
POSITION CONTROL APPARATUS

Oscar Weibel, Port Alberni, British Columbia, Canada, assignor to Yarrows Limited, Victoria, British Columbia, Canada Filed Apr. 13, 1959, Ser. No. 805,993

7 Claims. (Cl. 121—38)

This invention relates to apparatus for controlling the movement of and adjustably positioning an element such as a saw, guide, line bar, carriage, blocks, etc., in relation to a stationary object.

The invention deals with a control system whereby a movable element capable of assuming a number of different positions may be caused to assume any selected one of said positions.

The invention is particularly applicable to the lumber industry in the positioning of a saw or gang of saws to cut desired thicknesses of logs.

This invention provides control apparatus which allows an operator to automatically position a saw or other element in one of a number of selected positions.

The control system defined herein is particularly adapted to control apparatus wherein the movable element is pneumatically or hydraulically operated. By "fluid pressure operation" I include pneumatic or hydraulic operation and by "fluid pressure means" I include pneumatic or hydraulic operation. Means are provided whereby the control system in conjunction with the element moving means will cause the element to move at a certain speed towards the selected position until the element is a predetermined distance from said position, at which time the element is caused to move at a slower speed until the selected position is reached and the motion of the element is stopped. Such speed control is achieved by controlling the flow of fluid under pressure to operate the moving element and avoids overshooting and hunting.

It is an object of this invention to provide means for controlling and selectively positioning a movable element.

It is an object of this invention to provide apparatus wherein an element is moved by fluid pressure means and wherein means are provided for controlling and selectively positioning said element.

It is an object of this invention to provide apparatus wherein an element is moved by fluid pressure means and where the rate of movement is determined by controlling the speed of power operation and wherein means are provided for decreasing the speed of power operation when the element approaches its desired position to avoid hunting or overshooting by the element.

The drawing illustrates a preferred embodiment of the invention wherein apparatus is shown for controlling the position of an object such as the line bar 10 relative to a datum such as the path 12 of the saw, schematically shown at 14.

Means are provided for moving the line bar 10 comprising cross rod 16 which is connected to the line bar and is slidably mounted and is provided at the end remote from the line bar with a piston 17 movable in a cylinder 18. The cylinder 18 is provided with an entry 20 at one end and an entry 19 at the other and these ports are connected by lines 21 and 23 respectively to the outlet ports of a four way self centering solenoid operated valve 22 having an outlet line 24 to a sump (not shown) an inlet line 26 and a movable channeled element 28 in the valve cylinder. The movable element 28 is designed so that on movement to the right, inlet fluid is supplied to move the piston 17 and the cross rod 16 to the right and when the movable element 28 is moved to the left, inlet pressure is supplied to move the piston 17 and cross rod 16 to the left.

The movable element 28 is biased by any desired means to a central position but may be moved to the left by the energization of a solenoid coil relay 30, or to the right by the energization of a solenoid coil relay 34. The inlet fluid pressure is supplied to line 26 through a pair of fluid lines in parallel, one line 36 being connected through a two position solenoid valve 38 and the other line 40 being connected to a hand adjusted regulating valve 42. The solenoid valve 38 is provided with a movable channeled element 44 movable from a left hand position which allows communication between a fluid supply line 46 and line 36 and a right hand position which closes fluid path through the valve 38.

The solenoid valve 38 is biased to the right hand or closed position but may be moved to the left to the open position by a solenoid coil relay 52. Also attached to the line bar is a steel rod 49 conveniently attached to the line bar at 56 and extending longitudinally in the direction of adjustable movement of the line bar. The rod 49 is longitudinally slidable in guides (not shown) and a pair of commutator bars 58 and 60 are attached to rod 49 for longitudinal movement therewith. The commutator bars 58 and 60 are preferably arranged on diametrically opposed sides of the rod. Commutator bars 58 and 60 are each made of conducting material with the conducting material in each bar being intermediately divided into two conducting lengths by insulating spacers 53 and 63 respectively.

An insulating brush holder 52 surrounds the rod 49 and commutator bars 58 and 60 and carries two sets of brushes adapted to contact the respective commutator bars in their longitudinal movement with the rod. The first set of brushes is located to contact the commutator bar 58 and comprises a series of brushes 54A, 54B, 54C, 54D, 54E, 54F, 54G, 54H and 54I, preferably equally spaced along the commutator and a pair of brushes 57 and 59 located respectively at each end of the series of brushes. Similarly a set of brushes is arranged to contact the bar 60 comprising a series of preferably equally spaced brushes 64A, 64B, 64C, 64D, 64E, 64F, 64G, 64H and 64I and a pair of brushes 67 and 69 at each end of the series. A set of push buttons 70A, 70B, 70C, 70D, 70E, 70F, 70G and 70H and 70I so that only one may be depressed at a time, are adapted when depressed to bridge connections between a power line and one of the series of brushes 54 and also one of the brushes 64.

An electric circuit is provided from a positive source of power through a pair of normally closed sequence switches 72 and 74 mounted on the line bar 10 to energize whichever push button (e.g. 70A) is depressed. With respect to such push button, the circuit is continued through the brush 54A corresponding to the depressed push button, through the commutator bar 58 and through whichever terminal brush 57 or 59 is on the same side of the insulating spacer 53 as is the energized brush 54A.

If the circuit includes terminal 57 then it is continued through the solenoid coil 76 of a relay 78 to the negative terminal of the power source. Solenoid coil 76 of the relay 78, when energized, actuates plunger 80 of relay 78 to complete a circuit through the solenoid coil of relay 30.

If the circuit includes terminal 59 then it is continued through the solenoid coil 82 of a relay 84 to the negative terminal of the power source. Solenoid coil 82 of the relay 84, when energized, actuates plunger 88 of relay 84 to complete a circuit through the solenoid coil of relay 34.

The second circuit energized by the button selected extends from the power source, through the bridging contacts closed by the button 70A, through the brush 64A corresponding to the button and through the coil 90 of a relay 92 to the negative terminal of the power source. Solenoid coil 90 of the relay, when energized, actuates plunger 94 of relay 92 to complete a circuit through the solenoid coil of relay 52.

The operation of the invention thus far described is as follows. When it is desired to move the line bar 10 to a desired position, the button corresponding to this position is pressed, and let it be assumed that this is button 70A. Coil 76 is then energized by the power circuit closing the corresponding bridging contact 80. The closing of bridging contact 80 energizes the coil of relay 30 to move the movable element 28 of valve 22 to the left, and cause the flow of fluid from inlet port 26 through port 23 to move the piston rod 16 and line bar 10 to the left. At the same time it will be noted that the corresponding lower commutator brush 64A is energized, energizing coil 90 closing the bridging contact 94, energizing the solenoid coil relay 52 whereby the relay 38 is moved to the left. This opens valve 38 to the passage of fluid so that flow through the valve 22 to the piston cylinder 18 is at a rate allowed by the parallel lines 36 and 40. As rod 49 moves in accord with the movement of line bar 10, it will be seen that the commutator insulating member 63 on the lower bar will contact brush 64A before the corresponding upper bar insulator 53 contacts brush 54A.

When lower bar insulator 63 occludes brush 64A, the line bar 10 is still moving to the left, since insulator 53 has not as yet occluded brush 54A. However, the occlusion of brush 64A de-energizes coil 90, opening bridging contact 94, de-energizing relay 52 and allowing element 44 of relay 38 to move to the right closing valve 44. Flow of pressure fluid through line 36 is therefore halted and the piston 17 and line bar 10 move at a slower rate actuated only by the fluid passing through line 40 until insulator 53 occludes brush 54A. When this occurs coil 76 of relay 78 is de-energized, allowing bridging contact 80 to open, de-energizing relay 30 and allowing element 28 to centre, shutting off all flow of pressure fluid to cylinder 18 and halting movement of the piston 17 and line bar 10. Due to the premature closing of valve 38, the final slow rate of movement of line bar 10 in approaching the desired position prevents hunt or overshoot.

It will be understood that if the button selected (say 70I) is to the right of the insulators 53 and 63 that the operation will be similar to that described above except that relays 84 and 34 are energized in place of relays 78 and 30, movement of element 28 of valve 22 is to the right with movement of piston 17, line bar 10 and the operating members attached thereto.

It will be noted that insulator 63 again acts prematurely to close valve 38 and slow the final movement of line bar 10 to prevent overshoot and hunting.

It will be noted that the circuit from the positive terminal of the power source is connected through sequence switches 72 and 74 to the push button console. The sequence switches 72 and 74 are forwardly biased and are mounted on the forward side of the line bar. An object in the path of forward movement of the line bar will thus open the power circuit and prevent further movement of the line bar 10 until the object is removed.

Means are provided for fractional movement of the line bar to locations more closely spaced than the spacing of the brushes 54 or the brushes 64. Such fractional location is achieved by providing a double acting piston 100 having a body 102 with a cylinder 104 at one end and a cylinder 106 at the other and a piston in each cylinder. The left hand piston 108 is stationary and the body 102 biased to the left but movable to the right relative thereto, a distance of one-quarter of the spacing between the brushes 54. The right hand piston 110 is movable and is rigidly connected to the brush holders 52 and both piston 110 and brush holder 52 are biased to the left toward body 102. Means 101 are provided for selectively supplying hydraulic fluid to the side of each piston adapted to move it against its respective bias. Fractional control is achieved in the following way. For movement of one-quarter of the spacing, fluid is applied to the cylinder 104 only to move body 102 and the brush holder 52 one-quarter unit to the right. For movement of three-quarters of a space, fluid is also applied both to the cylinder 104 and the cylinder 106 so that the cumulative movement of brush holder 52 is three-quarters of a unit. For movement of a half space fluid is applied only to cylinder 106.

What I claim as my invention is:

1. Means for preselecting a desired position and moving an object thereto comprising: a commutator bar attached to such object and longitudinally slidable in the desired direction of movement of the object, means for moving said object in such longitudinal direction, said bar comprising a forwardly and a rearwardly arranged length of conducting material separated by an insulating spacer of predetermined width, a series of commutator brushes longitudinally arranged beside the path of said commutator bar to slidably contact it, means for electrically energizing a selected one of said brushes, the forward conducting portion of said commutator bar being electrically connected to a control for said object moving means, said control being arranged when energized to move said object in the forward direction, and the rearward conducting portion of said commutator bar being electrically connected to a control for said object moving means, said control being arranged when energized to move said object in the rearward direction.

2. Means for preselecting a desired position and moving an object thereto comprising: a power device for moving said object in either direction and control means actuable to cause said power device to move or maintain stationary said object and to control the sense of movement thereof, a commutator bar attached to such object and arranged to slide longitudinally in said direction, said bar comprising a forwardly and a rearwardly arranged length of conducting material separated by an insulating spacer of predetermined length, a series of contacts longitudinally arranged beside the path of said commutator bar to slidably electrically contact it, a first electrical circuit including any selected contact in contact with the forward conducting portion, the forward conducting portion and a first solenoid coil adapted when energized to operate said control means to cause it to move said object in a forward direction until said insulating spacer is under said selected contact, and a second electrical circuit including any selected contact in contact with the rearward conducting portion, the rearward conducting portion and a second solenoid coil energizable by the selection of a contact at that time contacting said other portion, said second solenoid coil being adapted when energized to operate said control means to cause it to move said object in a rearward direction until said insulating spacer is under said selective contact and means for ensuring that only one of all said contacts may be energized at any one time.

3. Means for preselecting a desired position and moving an object thereto comprising: means for moving said object at a fast or a slow rate, including first switching means for determining a direction of movement, second switching means for determining whether said movement is fast or slow and third switching means for determining whether or not said object shall move, a pair of commutator bars connected to the object for longitudinal movement, each of said bars comprising a forward and a rearward length of conducting material separated by an insulating spacer, means for electrically contacting one of said commutator bars at one of the number of predetermined locations, means for operating said first switching means in accord with the location of said electrical contact relative to the insulating spacer whereby said object is moved in a direction to move said insulating spacer under said electrical contacting means to break said contact, said third switching means being so related to such electrical contacting means that movement of said object in said direction will take place until said insulating spacer is under said electrical contact and then cease, means for electrically contacting the other of said commutator bars simultaneously with the first at a location in the same sense as and substantially the same distance from the centre of the second spacer as the first location is from the first insulating spacer, said second insulating spacer being a predetermined amount wider than said first insulating spacer, said second switching means being so related to said second electrical contact location that movement of said object at the faster rate will take place until said insulating spacer is under said electrical contact whereupon said second switching means is operated to cause movement of said object at the slower rate.

4. Means for preselecting a desired position and moving an object thereto comprising a commutator bar longitudinally movable with respect to said object, said bar being made up of two lengths insulated from one another, a number of brushes mounted at evenly, longitudinally spaced locations on a brush holder and adapted to contact said commutator bar in its longitudinal movement, means for moving said object and said commutator bar relative to said brush holder as determined by the selective energization of one of said brushes whereby without movement of said brush holder said commutator bar will move distances which are integral number of spaces and means for moving said brush holder a fractional amount of the distance between said spaces.

5. Means for controlling the movement of and adjustably positioning an object comprising a fluid pressure operated power device for moving said object in either direction, control means actuable to cause said power device to move or maintain stationary said object and to control the sense of movement of said power device, a comutator bar attached to such object to slide longitudinally in said direction, said bar comprising a forwardly and a rearwardly arranged length of conducting material separated by an insulating spacer of predetermined length, a series of contacts longitudinally arranged relative to said commutator bar and beside the path thereof to slidably contact it, means electrically connecting the forward portion of said commutator bar with a relay adapted when energized to cause said control means to move said object in the forward direction, and means electrically connecting the rearward portion of said commutator bar with a relay adapted when energized to cause said control means to move said object in the rearward direction, and means for selectively energizing one only of said contacts at a time.

6. Means for preselecting a desired position and moving an object thereto, comprising fluid pressure operated means for controlling the movement of said object, a commutator bar movable with said object, said bar including a forward and a rearward length of conducting material separated by an insulating spacer, means for electrically energizing said commutator bar at selected positions corresponding to the desired location of said object, a pair of control circuits alternatively energizable depending on which side of said insulating spacer contact is made between said electrical energizing means and said bar; and each circuit being arranged to actuate said fluid pressure operated means to move said insulating spacer under said energizing means to halt said energization, means operable just before said insulating spacer reaches said location to reduce the speed of movement of said object.

7. Means as claimed in claim 6 wherein said operable means comprises a second commutator bar movable with said object, said second bar including a forward and a rearward length of conducting material separated by a second insulating spacer, said second insulating spacer being a predetermined amount wider than the first mentioned insulating spacer, means for energizing said second commutator bar at the same time as said first bar is energized at a location bearing the same relation to the centre of said second spacer as the first mentioned energization location bears to the first insulating spacer, said second commutator bar when energized causing said fluid pressure means to move at a faster rate of speed and when de-energized causing said fluid pressure means to move said object at a slower rate of speed.

References Cited in the file of this patent

UNITED STATES PATENTS

| 561,271 | Ongley | June 2, 1896 |
| 844,090 | Bijur | Feb. 12, 1907 |
| 1,904,112 | Achard | Apr. 18, 1933 |
| 2,707,501 | Craik | May 3, 1955 |
| 2,821,172 | Randall | Jan. 28, 1958 |

FOREIGN PATENTS

| 557,994 | Great Britain | Dec. 14, 1943 |